(12) United States Patent
Ikeda et al.

(10) Patent No.: US 9,910,423 B2
(45) Date of Patent: Mar. 6, 2018

(54) CONTROL APPARATUS FOR GIVING NOTIFICATION OF MAINTENANCE AND INSPECTION TIMES OF SIGNAL-CONTROLLED PERIPHERAL DEVICES

(71) Applicant: FANUC Corporation, Yamanashi (JP)

(72) Inventors: Yu Ikeda, Yamanashi (JP); Soichi Arita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 115 days.

(21) Appl. No.: 15/051,736

(22) Filed: Feb. 24, 2016

(65) Prior Publication Data

US 2016/0246274 A1    Aug. 25, 2016

(30) Foreign Application Priority Data

Feb. 25, 2015 (JP) ................................. 2015-035853

(51) Int. Cl.
*G05B 19/042*    (2006.01)
*G05B 19/4063*   (2006.01)

(52) U.S. Cl.
CPC ..... *G05B 19/4063* (2013.01); *G05B 19/0425* (2013.01)

(58) Field of Classification Search
None
See application file for complete search history.

(56) References Cited

U.S. PATENT DOCUMENTS

2008/0103715 A1* 5/2008 Tsuda .................. G07C 3/02
702/81

FOREIGN PATENT DOCUMENTS

| CN | 1502035 A | 6/2004 |
|---|---|---|
| CN | 101300469 A | 11/2008 |
| CN | 202781169 U | 3/2013 |
| CN | 104035394 A | 9/2014 |

(Continued)

OTHER PUBLICATIONS

Xingguang Duan and Yan Xu, Application of On-Line Inspection Probe of Machining Center in Free Curve Inspecting, 2008 IEEE., pp. 6036-6040.*

*Primary Examiner* — Tung Lau
(74) *Attorney, Agent, or Firm* — Hauptman Ham, LLP (57) ABSTRACT

A control apparatus in an automaton that operates in cooperation with a peripheral device, includes: an operating time accumulator regarding the output time of a control signal to the peripheral device or the output time of an operating signal from the peripheral device as operating time and determining cumulative operating time by adding up the operating times; a time-at-inspection recorder recording the cumulative operating time when inspection is performed as the cumulative operating time at inspection; a cumulative operating time comparator comparing the difference between the current cumulative operating time and the cumulative operating time at inspection, the cumulative operating time from the latest inspection, or the cumulative operating time after inspection, with a preset inspection interval; and, a maintenance request output unit outputting a maintenance request to the outside when the cumulative operating time after inspection obtained as a result of the comparison exceeds the preset inspection interval.

3 Claims, 6 Drawing Sheets

(56) References Cited

FOREIGN PATENT DOCUMENTS

| | | |
|---|---|---|
| DE | 102004028565 A1 | 1/2006 |
| DE | 202007019440 U1 | 7/2012 |
| DE | 112012001901 T5 | 1/2014 |
| JP | S58-223594 A | 12/1983 |
| JP | 2-173803 A | 7/1990 |
| JP | 2000-85926 A | 3/2000 |
| JP | 2000-311014 A | 11/2000 |
| JP | 2011-28678 A | 2/2011 |
| JP | 2014-174680 A | 9/2014 |

* cited by examiner

CONTROL APPARATUS FOR GIVING NOTIFICATION OF MAINTENANCE AND INSPECTION TIMES OF SIGNAL-CONTROLLED PERIPHERAL DEVICES

RELATED APPLICATIONS

The present application claims priority to Japanese Patent Application Number 2015-035853, filed Feb. 25, 2015, the disclosure of which is hereby incorporated by reference herein in its entirety.

BACKGROUND OF THE INVENTION

1. Field of the Invention

The present invention relates to a robot control apparatus, in particular, relating to a control apparatus provided with a function for giving notification of maintenance and inspection times of peripheral devices that operate in cooperation with an automaton such as a robot, machine tool or the like.

2. Description of the Related Art

Recently, in order to reduce unexpected downtime, functions which urge the user to perform periodical maintenance of a robot have been developed and applied. A robot operates as a system, and in most automated systems, automatons such as robots, machine tools and the like control their peripheral devices by DO (digital output) signals, etc., so as to perform operations in cooperation therewith. Accordingly, for the automated system to operate normally, it is necessary to maintain and inspect correctly not only the robot or machine tool but also their peripheral devices. However, the intervals of maintenance and inspection are not the same so it is difficult for the user to know the timings of maintenance and inspection for different devices.

There have been known inspection timing notifying apparatuses for industrial robots which calculate cumulative times of actual operation for components of the industrial robot and gives notification of the times of inspection when the cumulative operating time of each component reaches a predetermined time (e.g., Japanese Unexamined Patent Publication (Kokai) No. S58-223594, which will be referred to hereinbelow as "Patent Document 1"). In what is assumed to be the usual method, whereby maintenance and inspection is performed at constant intervals, it is not possible to check individual components at the optimum timing for each of them. In other words, there is a risk or possibility that some components have already reached the end of their service life while others unnecessarily undergo maintenance and inspection. In the apparatus described in Patent Document 1, the optimal maintenance and inspection timings for individual components can be determined.

There has been a known numerically controlled apparatus that, at each time of inspection, determines the next timing of inspection based on the variation of state quantity from the previous inspection, and notifies the timings of inspection for components of a machine tool (e.g., Japanese Unexamined Patent Publication (Kokai) No. 2014-174680). In this apparatus, the interval of inspection is set to be long while the variation of state quantity is small, whereas the interval of inspection is set to be short while the variation of state quantity is large, whereby it is possible to perform inspection at the optimal timing for each component.

Applying such functions or combinations thereof to a robot, machine tool or the like which constitute the automated system makes it possible to properly perform maintenance and inspection thereon. However, the components that constitute an automated system are not always controlled by a controller including a processor and storage as in the robot or machine tool, but there are many peripheral devices that operate in accordance with the signals from the control apparatus of the robot or machine tool. In order for each of these peripheral devices to add up the actual time of operation and measure and record the state quantity, it is necessary to provide an additional device, hence such functions are not easy to implement.

SUMMARY OF THE INVENTION

It is therefore an object of the present invention to provide a control apparatus that can give proper notification of the times of maintenance and inspection of peripheral devices that constitute an automated system, without adding an extra device.

A control apparatus according to one aspect of the present invention is a control apparatus for use in an automaton that operates in cooperation with a peripheral device on the basis of signal input and output, comprising: an operating time accumulator configured to regard the output time of a control signal to the peripheral device or the output time of an operating signal from the peripheral device, as operating time and determines cumulative operating time by adding up the operating times; a time-at-inspection recorder configured to record the cumulative operating time when inspection is performed, as the cumulative operating time at inspection; a cumulative operating time comparator configured to compare the difference between the current cumulative operating time and the cumulative operating time at inspection, the cumulative operating time from the latest inspection, or the cumulative operating time after inspection, with a preset inspection interval; and, a maintenance request output unit configured to output a maintenance request to the outside when the cumulative operating time after inspection obtained as a result of the comparison exceeds the preset inspection interval.

BRIEF DESCRIPTION OF THE DRAWINGS

The object, features and advantages of the present invention will be better understood from the following description of the embodiments, taken together with the drawings wherein.

DESCRIPTION OF THE INVENTION

Referring now to the drawings, the control apparatuses according to the present invention will be described.

First Embodiment

Figure 1:
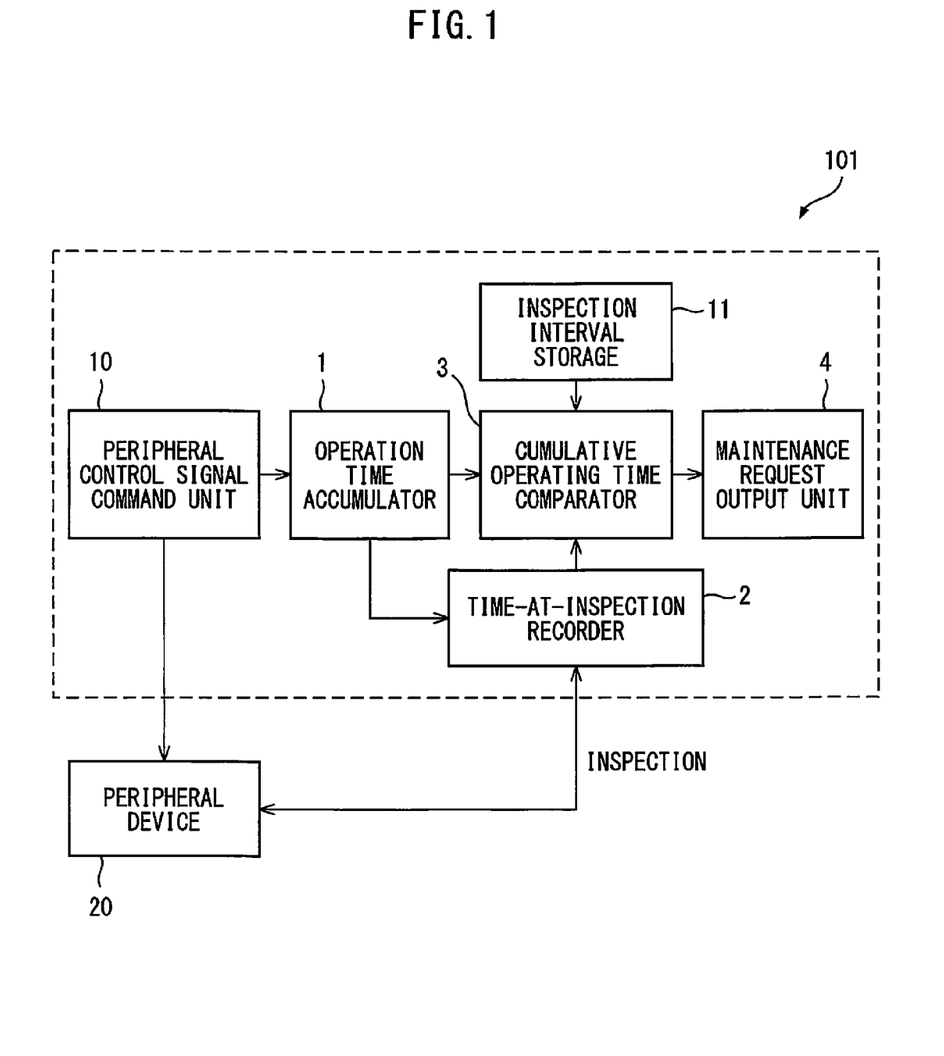
FIG. 1 is a block diagram showing a control apparatus according to a first embodiment of the present invention.

A control apparatus according to a first embodiment of the present invention will be described. FIG. 1 is a block diagram showing a control apparatus according to the first embodiment of the present invention. A control apparatus 101 according to the first embodiment of the present invention is a control apparatus for use in an automaton that operates in cooperation with a peripheral device 20 on the basis of signal input and output, and includes an operating time accumulator 1 which, by regarding the output time of a control signal to the peripheral device 20 or the output time of an operating signal from the peripheral device 20, as operating time, determines cumulative operating time by adding up the operating times; a time-at-inspection recorder 2 that records the cumulative operating time when inspection is performed, as the cumulative operating time at inspection; a cumulative operating time comparator 3 that compares the difference between the current cumulative operating time and the cumulative operating time at inspection, the cumulative operating time from the latest inspection, or the cumulative operating time after inspection, with a preset inspection interval; and a maintenance request output unit 4 that outputs a maintenance request to the outside when the cumulative operating time after inspection obtained as a result of the comparison exceeds the preset inspection interval.

A peripheral control signal command unit 10 outputs the control signal to the peripheral device 20 in accordance with the program or the like of the robot or machine tool.

The operating time accumulator 1 adds up times in which the control signal is output so as to calculate the cumulative operating time of the peripheral device 20. Alternatively, in the case where the peripheral device 20 outputs an operation signal, times in which the operation signal is output may be added up so as to be used as the cumulative operating time of the peripheral device 20.

When performing maintenance and inspection of the peripheral device 20, the user notifies the control apparatus 101, by operating the control apparatus, or inputting a signal therein, etc. The time-at-inspection recorder 2, on receiving a notification of the execution of inspection from the user, acquires the cumulative operating time at that point of time from the operating time accumulator 1 and records the time as the cumulative operating time at inspection.

The cumulative operating time comparator 3 compares the cumulative operating time acquired from the operating time accumulator 1 with the cumulative operating time at inspection that has been recorded in the time-at-inspection recorder 2. When the difference, i.e., the cumulative operating time after inspection, is greater than the preset inspection interval, the peripheral apparatus is determined to reach its inspection timing. The inspection interval can be previously stored in an inspection interval storage 11.

When it is found from the comparison result of the cumulative operating time comparator 3 that the cumulative operating time after inspection is greater than the inspection interval, the maintenance request output unit 4 indicates this state by text output, signal output, lamp lighting, alarm sound and/or any other means that can be perceived by the user to request maintenance of the peripheral apparatus.

FIG. 1 shows an example where a single peripheral device alone manages inspection timing, but not being limited to such an example, there may be one or a plurality of peripheral devices which manage inspection timing.

It is known that the longer electric parts are energized, the more worn those parts are from the view point of the service life of capacitors and that the greater the number of times relay parts are energized, the more worn those parts become. For this reason, the operating state of the peripheral device that is controlled by DO and/or other signals of the control apparatus can be understood based on the ON-time duration and the number of times the device is turned on, hence it is possible to monitor and indicate the timing of maintenance even if the peripheral device has neither a processing device nor storage device. As to a peripheral device that controls its operation by itself, the host machine can receive DI (digital input) signals from the peripheral device and can use the DI signals as the signals indicating ON-time or the number of times the device is turned on. It is also possible to count the number of commands to the peripheral device by use of a register or the like and thereby estimate the maintenance timing based on that count. Understanding the operation state and promoting maintenance and inspection at proper timings make it possible to suppress the risk of shutdown of the automated system due to malfunction of the peripheral device.

Figure 2:
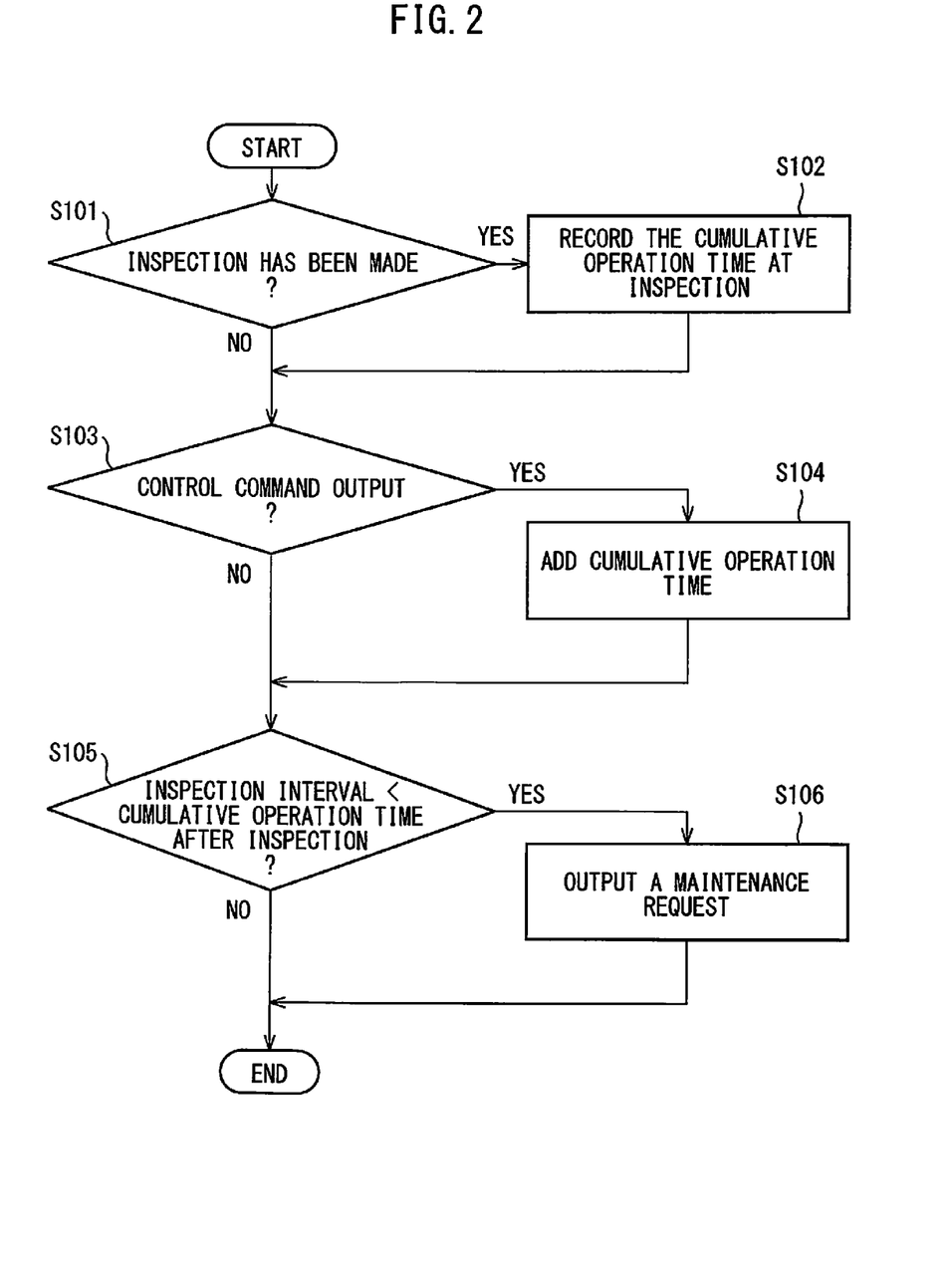
FIG. 2 is a flow chart for illustrating the operation sequence of a control apparatus according to the first embodiment of the present invention.

Next, the operation sequence of the control apparatus according to the first embodiment of the present invention will be described using a flow chart shown in FIG. 2.

First, at Step S101 it is determined whether or not an inspection of the peripheral device 20 has been made. When the user performs maintenance and inspection of the peripheral device, notification thereof is given by the control apparatus 101. At Step S102 the cumulative operating time at the point of time is recorded as the cumulative operating time at inspection. The notice of the inspection by the user may be given by operating the control apparatus or by inputting a signal to the control apparatus. On the other hand, when no notice of maintenance and inspection of the peripheral device has been given by the user, the cumulative operating time at inspection is regarded as zero.

Next, at Step S103 it is determined whether or not a control command for actuating the peripheral device has been given from the control apparatus. At Step S104 when the control signal has been output, the output time of the control signal is added to the cumulative operating time. As the control signal, for example DO and other signals are conceivable. When the peripheral device is able to output an operation signal, the signal may be used as a DI signal to be input to the control apparatus so that its input time is regarded as the operating time and added up. Addition of cumulative operating times may be done by adding the duration of the monitoring period every time the control command or the operation signal is ON at the time of each monitoring, or may be done by calculating the ON-time by detecting the leading and trailing edges of the signal. On the other hand, when no control signal is output, addition of cumulative operating times is not performed.

Next, at Step S105 it is determined whether or not the difference between the current cumulative operating time and the cumulative operating time at inspection, or the cumulative operating time after inspection, is greater than a preset interval of inspection. When the cumulative operating time after inspection is greater than the preset interval of inspection, the control apparatus regards that the peripheral device has reached the timing of maintenance and inspection and outputs a request for maintenance at Step S106. Text output, lamp lighting, alarm sound and/or any other means that can be perceived by the user can be envisaged as the output for the maintenance request. When the cumulative operating time after inspection is equal to or shorter than the preset interval of inspection, the process is ended without output of a maintenance request.

As described above, according to the control apparatus of the first embodiment of the present invention, the period in which the operation signal is output is regarded as the operating time of the peripheral device and accumulated, whereby it is possible to remind the user of the necessity of periodic maintenance and inspection of the peripheral device, which is required as the operating time increases.

Second Embodiment

Figure 3:
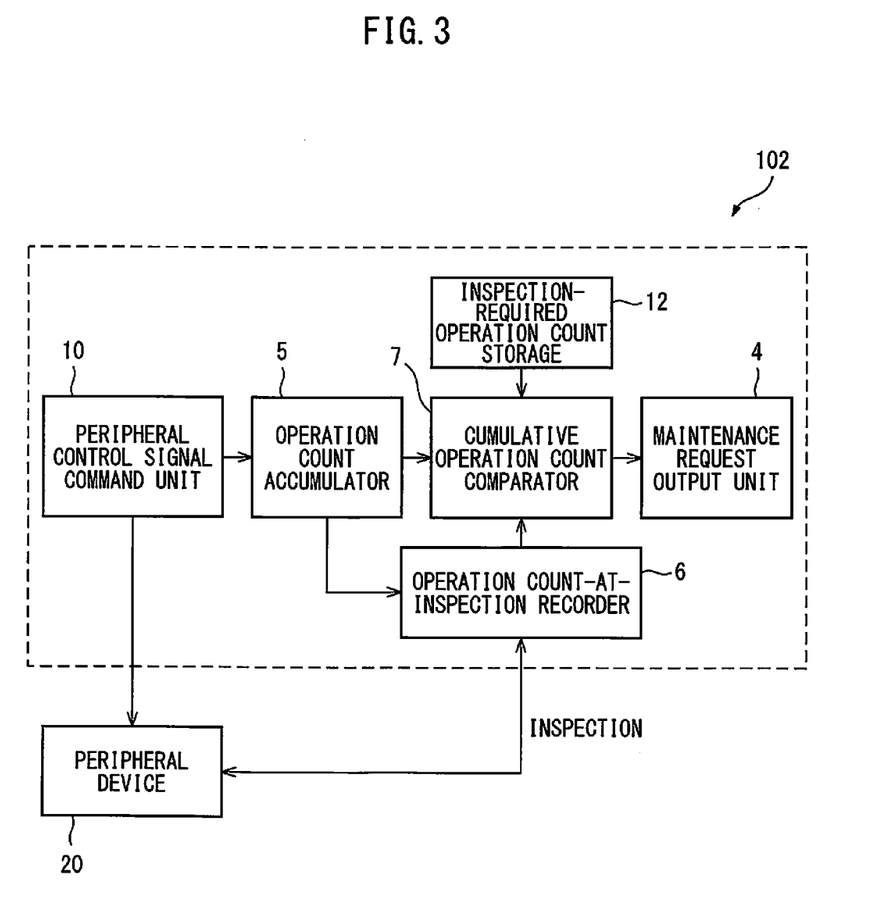
FIG. 3 is a block diagram showing a control apparatus according to a second embodiment of the present invention.

Next, a control apparatus according to a second embodiment of the present invention will be described. FIG. 3 is a block diagram showing a control apparatus according to the second embodiment of the present invention. A control apparatus 102 according to the second embodiment of the present invention is a control apparatus for use in an automaton that operates in cooperation with a peripheral device 20 on the basis of signal input and output, and includes an operation count accumulator 5 which, by regarding the number of times of outputting a control signal to the peripheral device 20 or the number of times of outputting an operation signal from the peripheral device 20, as the count of operations, determines the cumulative operation count by adding up the count of operations; an operation count-at-inspection recorder 6 that records the cumulative operation count at the time of inspection as the cumulative operation count at inspection; a cumulative operation count comparator 7 that compares the difference between the cumulative operation count and the cumulative operation count at inspection, i.e., the cumulative operation count from the latest inspection or the cumulative operation count after inspection, with a preset inspection-required cumulative operation count; and a maintenance request output unit 4 that outputs a maintenance request to the outside when the cumulative operation count after inspection obtained as a result of the comparison exceeds the preset inspection-required cumulative operation count.

A peripheral control signal command unit 10 outputs a control signal to the peripheral device 20 in accordance with the program or the like of the robot or machine tool.

The operation count accumulator 5 counts the number of times of the control signal being output to obtain the cumulative operation count of the peripheral device 20. Alternatively, when the peripheral device outputs an operation signal, the number of times of this operation signal being output may be counted so as to be used as the cumulative operation count of the peripheral device 20.

When maintenance and inspection of the peripheral device 20 is performed by the user, the user notifies the control apparatus 102, by operating the control apparatus or inputting a signal therein, etc.

The operation count-at-inspection recorder 6, on receiving a notification of the execution of inspection from the user, acquires the cumulative operation count at that point of time from the operation count accumulator 5 and records the count as the cumulative operation count at inspection.

The cumulative operation count comparator 7 compares the cumulative operation count acquired from the operation count accumulator 5 with the cumulative operation count at inspection that has been recorded in the operation count-at-inspection recorder 6. When the difference, i.e., the cumulative operation count after inspection or the cumulative operation count from the previous inspection, is greater than the preset inspection-required cumulative operation count, the peripheral apparatus is determined to reach its inspection timing. The inspection-required cumulative operation count can be previously stored in an inspection-required cumulative operation count storage 12.

When it is found from the comparison result of the cumulative operation count comparator 7 that the cumulative operation count after inspection is greater than the inspection-required cumulative operation count, the maintenance request output unit 4 indicates this state by text output, signal output, lamp lighting, alarm sound and/or any other means that can be perceived by the user to request maintenance of the peripheral apparatus.

FIG. 3 shows an example where a single peripheral device alone manages inspection timing, but not being limited to such an example, there may be one or a plurality of peripheral devices which manage inspection timing.

Figure 4:
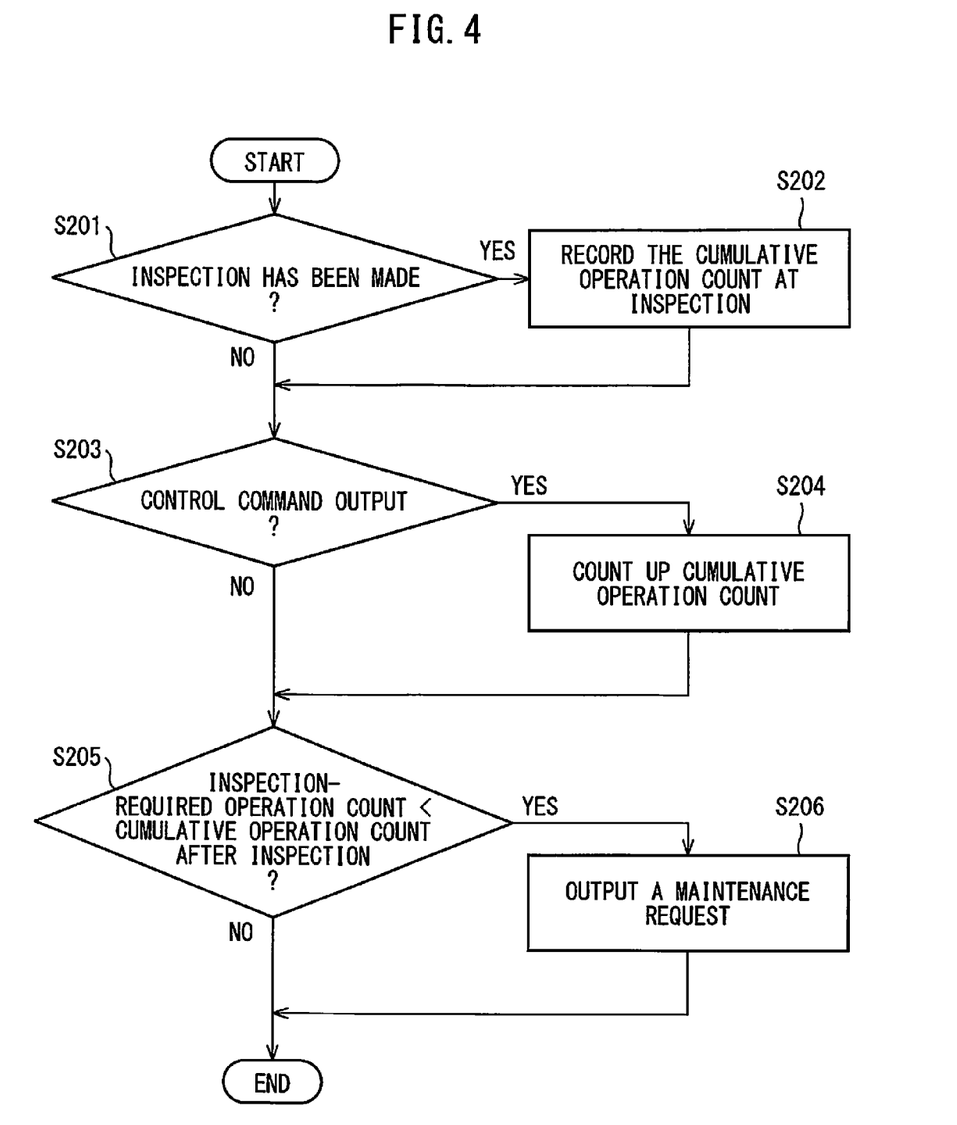
FIG. 4 is a flow chart for illustrating the operation sequence of a control apparatus according to the second embodiment of the present invention.

Next, the operation sequence of the control apparatus according to the second embodiment of the present invention will be described using a flow chart shown in FIG. 4.

At Step S201 it is determined whether or not an inspection of the peripheral device 20 has been made. When the user performs maintenance and inspection of the peripheral device 20, notification thereof is given by the control apparatus 102. At Step S202 the cumulative operation count at the point of time is recorded as the cumulative operation count at inspection. The notice of the inspection by the user may be given by operating the control apparatus or by inputting a signal to the control apparatus. On the other hand, when no notice of maintenance and inspection of the peripheral device has been given by the user, the cumulative operation count at inspection is regarded as zero.

Next, at Step S203 it is determined whether or not a control command for actuating the peripheral device has been given from the control apparatus. At Step S204 when the control signal has been output, the cumulative operation count is counted up. As the control signal, for example DO and other signals may be considered. When the peripheral device is able to output an operation signal, the signal may be used as a DI signal to be input to the control apparatus so that the input number of times is regarded as the operation count and added up. The cumulative operation count may be incremented by detecting the leading and trailing edges of the control command or the operation signal. On the other hand, when no control signal is output, cumulative operation count is not incremented.

Next, at Step S205 it is determined whether or not the difference between the current cumulative operation count and the cumulative operation count at the previous inspection, or the cumulative operation count after inspection, is greater than the preset inspection-required cumulative operation count. When the cumulative operation count after inspection is greater than the preset inspection-required cumulative operation count, the control apparatus regards that the peripheral device reaches the timing of maintenance and inspection and outputs a request for maintenance at Step S206. Text output, lamp lighting, alarm sound and/or any other means that can be perceived by the user can be envisaged as the output for the maintenance request. On the other hand, when the cumulative operation count after inspection is equal to or shorter than the preset inspection-required cumulative operation count, the process is ended without output of a maintenance request.

As described above, according to the control apparatus of the second embodiment of the present invention, the number of times of the operation signal being output is accumulated as the operation count of the peripheral device, whereby it is possible to remind the user of the necessity of periodic maintenance and inspection of the peripheral device, which is required as the number of times of operation increases.

Third Embodiment

Figure 5:
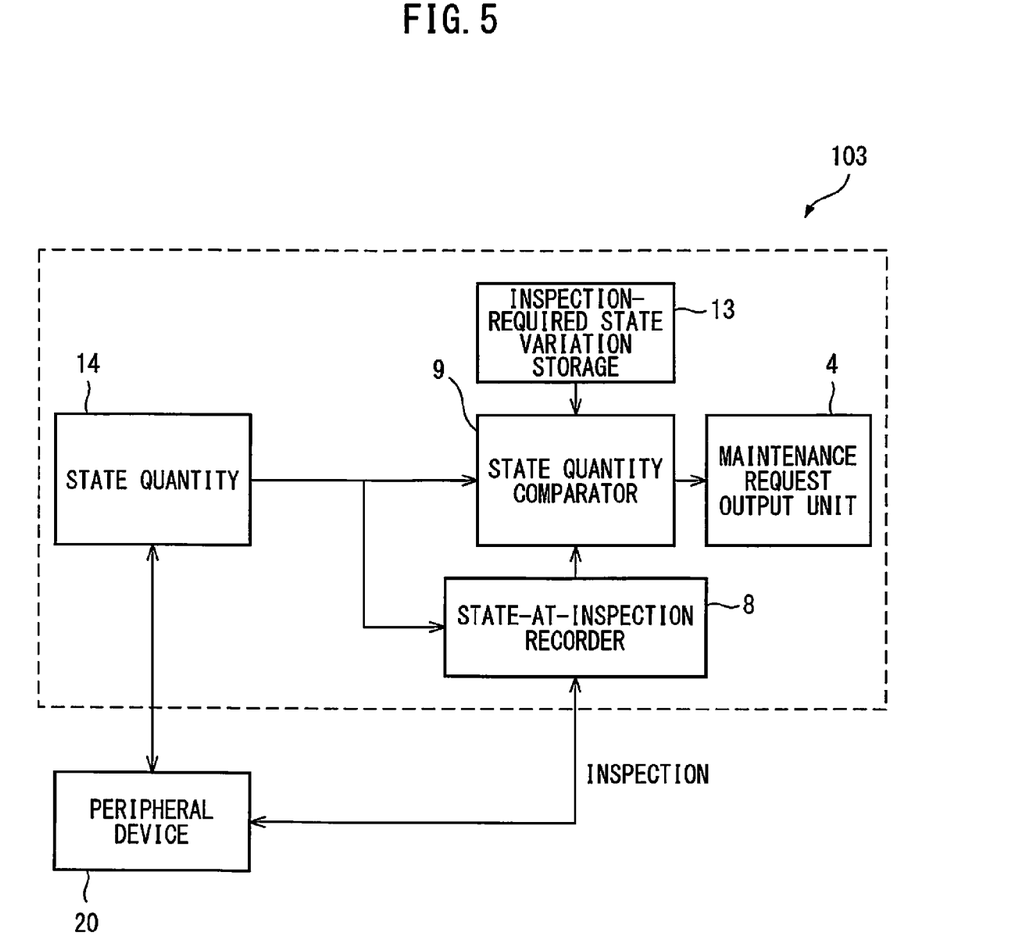
FIG. 5 is a block diagram showing a control apparatus according to a third embodiment of the present invention; and, FIG. 6 is a flow chart for illustrating the operation sequence of a control apparatus according to the third embodiment of the present invention.

Next, a control apparatus according to a third embodiment of the present invention will be described. FIG. 5 is a block diagram showing a control apparatus according to the third embodiment of the present invention. A control apparatus 103 according to the third embodiment of the present invention is a control apparatus for use in an automaton that operates in cooperation with a peripheral device 20 on the basis of signal input and output and records a state quantity that varies with the operation of the peripheral device 20, and includes a state-at-inspection recorder 8 that records the state quantity at the time of inspection as the state quantity at inspection; a state quantity comparator 9 that compares the difference between the current state quantity and the state quantity at inspection, i.e., the variation of the state quantity from the latest inspection or the variation of the state quantity after inspection, with a preset inspection-required variation of the state quantity, or compares the current state quantity with a preset inspection-required state quantity; and, a maintenance request output unit 4 that outputs a maintenance request to the outside when the variation of the state quantity after inspection obtained as a result of the comparison exceeds the preset inspection-required variation of the state quantity, or when the state quantity exceeds the inspection-required state quantity.

A state quantity acquisition unit 14 acquires the state quantity of the peripheral device 20 and transmits the state quantity to the state quantity comparator 9 and the state-at-inspection recorder 8. The state quantity may be a counted or calculated value by the control apparatus, or an output from the peripheral device 20 or a processed result of the output.

When maintenance and inspection of the peripheral device 20 is performed by the user, the user notifies the control apparatus 103 thereof, by operating the control apparatus, inputting a signal therein, etc.

The state-at-inspection recorder 8, on receiving a notification of the execution of inspection from the user, acquires the state quantity at that point of time from the state quantity acquisition unit 14, and records the state quantity as the state quantity at inspection.

The state quantity comparator 9 compares the current state quantity obtained from the state quantity acquisition unit 14 with the state quantity at inspection stored in the state-at-inspection recorder 8. When the difference, i.e., the variation of the state quantity from the previous inspection, is greater than the preset inspection-required variation of the state quantity, the peripheral apparatus is determined to reach its inspection timing. When the state quantity is not a type of value that is cumulative, the state quantity comparator 9 may compare the current state quantity with a preset inspection-required state quantity. The inspection-required variation of the state quantity and the inspection-required state quantity can be stored in an inspection-required state variation storage 13.

When, from the comparison result of the state quantity comparator 9, the variation of the state quantity after inspection is greater than the inspection-required variation of the state quantity, or when the state quantity is greater than the inspection-required state quantity, the maintenance request output unit 4 indicates this state by text output, signal output, lamp lighting, alarm sound and/or any other means that can be perceived by the user to request maintenance of the peripheral apparatus 20.

FIG. 5 shows an example where a single peripheral device alone manages inspection timing, but not being limited to such an example, there may be one or a plurality of peripheral devices which manage inspection timing.

Figure 6:
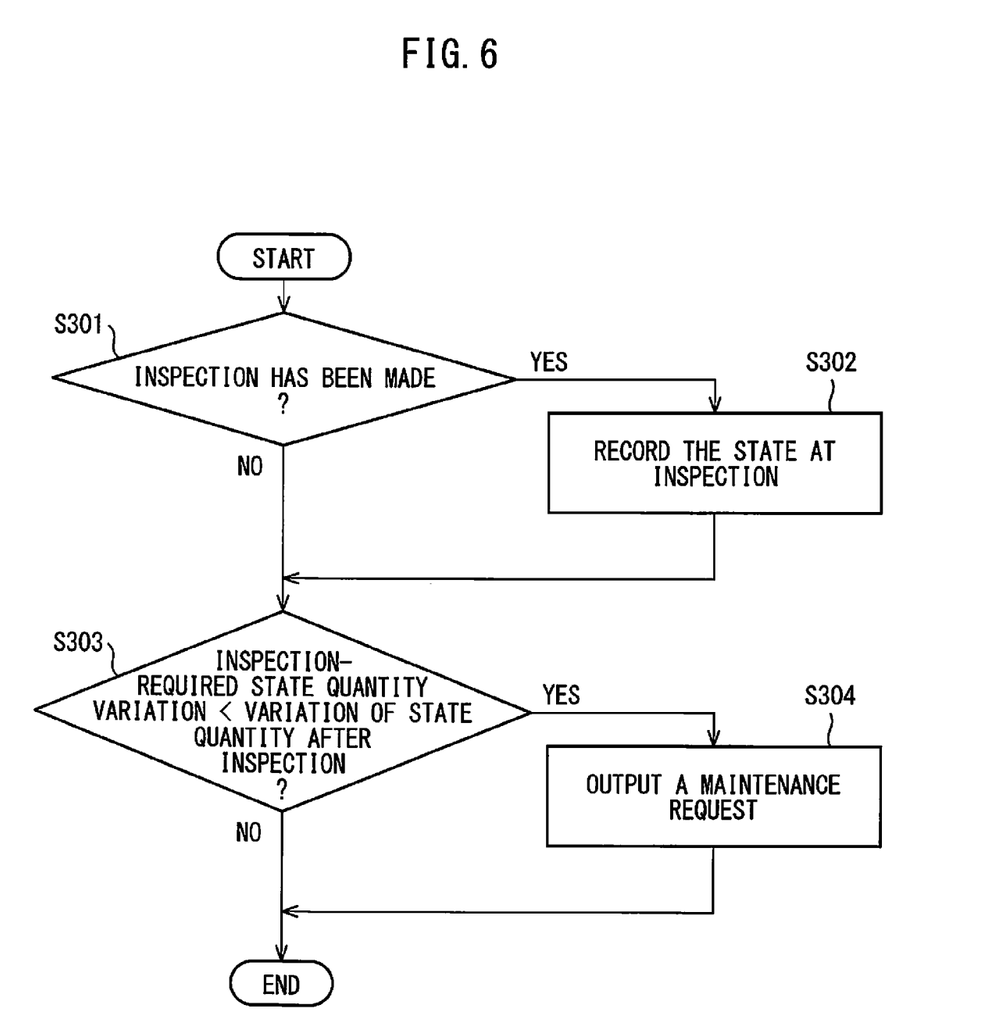

Next, the operation sequence of the control apparatus according to the third embodiment of the present invention will be described using a flow chart shown in FIG. 6.

At Step S301 it is determined whether or not an inspection of the peripheral device 20 has been made. When the user performs maintenance and inspection of the peripheral device, notification thereof is given by the control apparatus 103. At Step S302 the state quantity at the point of time is recorded as the state at inspection. The notice of the inspection by the user may be given by operating the control apparatus or by inputting a signal to the control apparatus. The state quantity may be a value on a resistor that counts the number of times of the operation command to the peripheral device or may be an input of the amount of operation from the peripheral device. On the other hand, when no notice of maintenance and inspection of the peripheral device has been given by the user, the state at inspection is regarded as the initial state before the actuation of the peripheral device.

Next, at Step S303 it is determined whether or not the difference between the current state quantity and the state at inspection, or the variation of the state quantity after inspection is greater than the preset inspection-required variation of state quantity. When the variation of the state quantity after inspection is greater than the inspection-required variation of the state quantity, the control apparatus regards that the peripheral device reaches the timing of maintenance and inspection and outputs a request for maintenance at Step S304. Determination of inspection timing may also be made by comparing the current state quantity with the preset inspection-required state quantity, not based on the difference from the previous inspection. Text output, lamp lighting, alarm sound and/or any other means that can be perceived by the user can be envisaged as the output for the maintenance request. When the variation of state quantity after inspection is equal to or smaller than the inspection-required variation of state quantity, the process is ended without output of a maintenance request.

As described above, according to the control apparatus of the third embodiment of the present invention, it is possible to remind the user of the necessity of periodic maintenance and inspection of the peripheral device, which is required as the state quantity changes.

According to the control apparatus of the embodiments of the present invention, use of the operation signal to estimate the operating time of the peripheral device and calculate the cumulative operating time, makes it possible to remind the user of the necessity of periodic maintenance and inspection of the peripheral device, which is required as the operating time increases.

The invention claimed is:

1. A control apparatus for use in an automaton that operates in cooperation with a peripheral device on the basis of signal input and output, the control apparatus comprising:
    an operating time accumulator configured to regard the output time of a control signal to the peripheral device or the output time of an operating signal from the peripheral device as operating time and determine cumulative operating time from the sum of all the operating times;
    a time-at-inspection recorder configured to record the cumulative operating time when inspection is performed, as the cumulative operating time at inspection;
    a cumulative operating time comparator configured to compare the difference between the current cumulative operating time and the cumulative operating time at inspection, which is the cumulative operating time from a previous inspection or the cumulative operating time after inspection, with a preset inspection interval; and a maintenance request output unit configured to output a maintenance request to the outside of the control operator when the cumulative operating time after inspection obtained as a result of the comparison exceeds the preset inspection interval.

2. A control apparatus for use in an automaton that operates in cooperation with a peripheral device on the basis of signal input and output, the control apparatus comprising:

an operation count accumulator configured to regard the number of times of outputting a control signal to the peripheral device or the number of times of an operation signal from the peripheral device as the number of operations and determine the cumulative operation count from the sum of the number of operations;

an operation count-at-inspection recorder configured to record the cumulative operation count at the time of inspection as the cumulative operation count at inspection;

a cumulative operation count comparator configured to compare the difference between the cumulative operation count and the cumulative operation count at inspection, which is the cumulative operation count from a previous inspection or the cumulative operation count after inspection, with a preset inspection-required cumulative operation count; and a maintenance request output unit configured to output a maintenance request to the outside of the control operator when the cumulative operation count after inspection obtained as a result of the comparison exceeds the preset inspection-required cumulative operation count.

3. A control apparatus for use in an automaton that operates in cooperation with a peripheral device on the basis of signal input and output and records a state quantity that varies with the operation of the peripheral device, the control apparatus comprising:

a state-at-inspection recorder configured to record the state quantity at the time of inspection as the state quantity at inspection;

a state quantity comparator configured to
  compare the difference between the current state quantity and the state quantity at inspection, which is the variation of the state quantity from a previous inspection or the variation of the state quantity after inspection, with a preset inspection-required variation of the state quantity, or
  compare the current state quantity with a preset inspection-required state quantity; and a maintenance request output unit configured to output a maintenance request to the outside of the control operator
  when the variation of the state quantity after inspection obtained as a result of the comparison exceeds the preset inspection-required variation of the state quantity, or.

* * * * *